United States Patent
Lin et al.

(10) Patent No.: US 10,020,133 B2
(45) Date of Patent: Jul. 10, 2018

(54) POWER SWITCHING APPARATUS

(71) Applicant: Chicony Power Technology Co., Ltd., New Taipei (TW)

(72) Inventors: Jhe-Yu Lin, New Taipei (TW); Chin-Hsing Tsai, New Taipei (TW); Chien-Hung Chen, New Taipei (TW); Chung-Shu Lee, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 204 days.

(21) Appl. No.: 15/084,300

(22) Filed: Mar. 29, 2016

(65) Prior Publication Data

US 2017/0287655 A1 Oct. 5, 2017

(51) Int. Cl.
*H01H 9/54* (2006.01)
*H02J 4/00* (2006.01)

(52) U.S. Cl.
CPC .............. *H01H 9/54* (2013.01); *H02J 4/00* (2013.01)

(58) Field of Classification Search
USPC ............................................ 307/113, 64, 66
See application file for complete search history.

(56) References Cited

U.S. PATENT DOCUMENTS

2005/0157522 A1* 7/2005 Osaka ............... H02M 3/33569
363/21.02
2013/0264879 A1* 10/2013 Shih ....................... H02J 9/005
307/66

* cited by examiner

*Primary Examiner* — Rexford Barnie
*Assistant Examiner* — Xuan Ly
(74) *Attorney, Agent, or Firm* — Muncy, Geissler, Olds & Lowe, P.C.

(57) ABSTRACT

A power switching apparatus includes a detection circuit, a control circuit and an auxiliary power circuit. The detection circuit comprises a voltage adjusting unit, a delay unit, a first switch unit and an isolation unit. The auxiliary power circuit comprises an auxiliary power input side and an output side. When a main power supplies power normally or the main power stops supplying power but the delay unit continues working in a setting time, the first switch unit is turned on. The isolation unit sends a first signal to the control circuit. The auxiliary power input side does not conduct to the output side. When the main power stops supplying power and the delay unit stops working, the first switch unit is turned off. The isolation unit does not send the first signal to the control circuit. The auxiliary power input side conducts to the output side.

6 Claims, 4 Drawing Sheets

POWER SWITCHING APPARATUS

BACKGROUND OF THE INVENTION

Field of the Invention

The present invention relates to a switching apparatus, and especially relates to a power switching apparatus.

Description of the Related Art

The related art power supply of the related art network communication equipment has the uninterruptible power function. When main power fails, the auxiliary power continues to supply power, so that the related art network communication equipment still works. Therefore, the related art power supply comprises a related art power switching apparatus to switch between the main power and the auxiliary power. In the normal condition, the related art power supply converts the main power into the direct current power and then outputs the direct current power to the related art network communication equipment. When the related art power switching apparatus detects that the main power fails, the related art power switching apparatus switches on the auxiliary power to continue to supply power to meet the uninterruptible power requirement of the related art network communication equipment. However, the switching time of the related art power switching apparatus cannot be adjusted and thus cannot meet different requirements for the switching times for various systems. Moreover, in some specific conditions or operations, the related art power switching apparatus may malfunction. Even the related art power switching apparatus switches between the main power and the auxiliary power frequently to cause the system failing.

SUMMARY OF THE INVENTION

In order to solve the above-mentioned problems, an object of the present invention is to provide a power switching apparatus.

In order to achieve the object of the present invention mentioned above, the power switching apparatus comprises a detection circuit, a control circuit and an auxiliary power circuit. The detection circuit comprises a voltage adjusting unit, a delay unit, a first switch unit and an isolation unit. The auxiliary power circuit comprises an auxiliary power input side and an output side. The first switch unit is electrically connected to the voltage adjusting unit and the delay unit. The voltage adjusting unit adjusts a starting voltage of the first switch unit. When a main power supplies power normally or the main power stops supplying power but the delay unit continues working in a setting time, the first switch unit is turned on. The setting time is determined by a system requirement. When the main power stops supplying power and the delay unit stops working, the first switch unit is turned off. The isolation unit is electrically connected to the first switch unit. When the first switch unit is turned on, the isolation unit sends out a first signal. When the first switch unit is turned off, the isolation unit does not send out the first signal. The control circuit is used to receive the first signal. The auxiliary power circuit is electrically connected to the control circuit. When the control circuit receives the first signal, the control circuit renders that the auxiliary power input side does not conduct to the output side (namely, the control circuit breaks a path between the auxiliary power input side and the output side, so that power cannot be sent from the auxiliary power input side to the output side). When the control circuit does not receive the first signal, the control circuit renders that the auxiliary power input side conducts to the output side (namely, the control circuit conducts the path between the auxiliary power input side and the output side, so that power can be sent from the auxiliary power input side to the output side).

DETAILED DESCRIPTION OF THE INVENTION

Please refer to following detailed description and figures for the technical content of the present invention. The following detailed description and figures are referred for the present invention, but the present invention is not limited to it.

Figure 1:
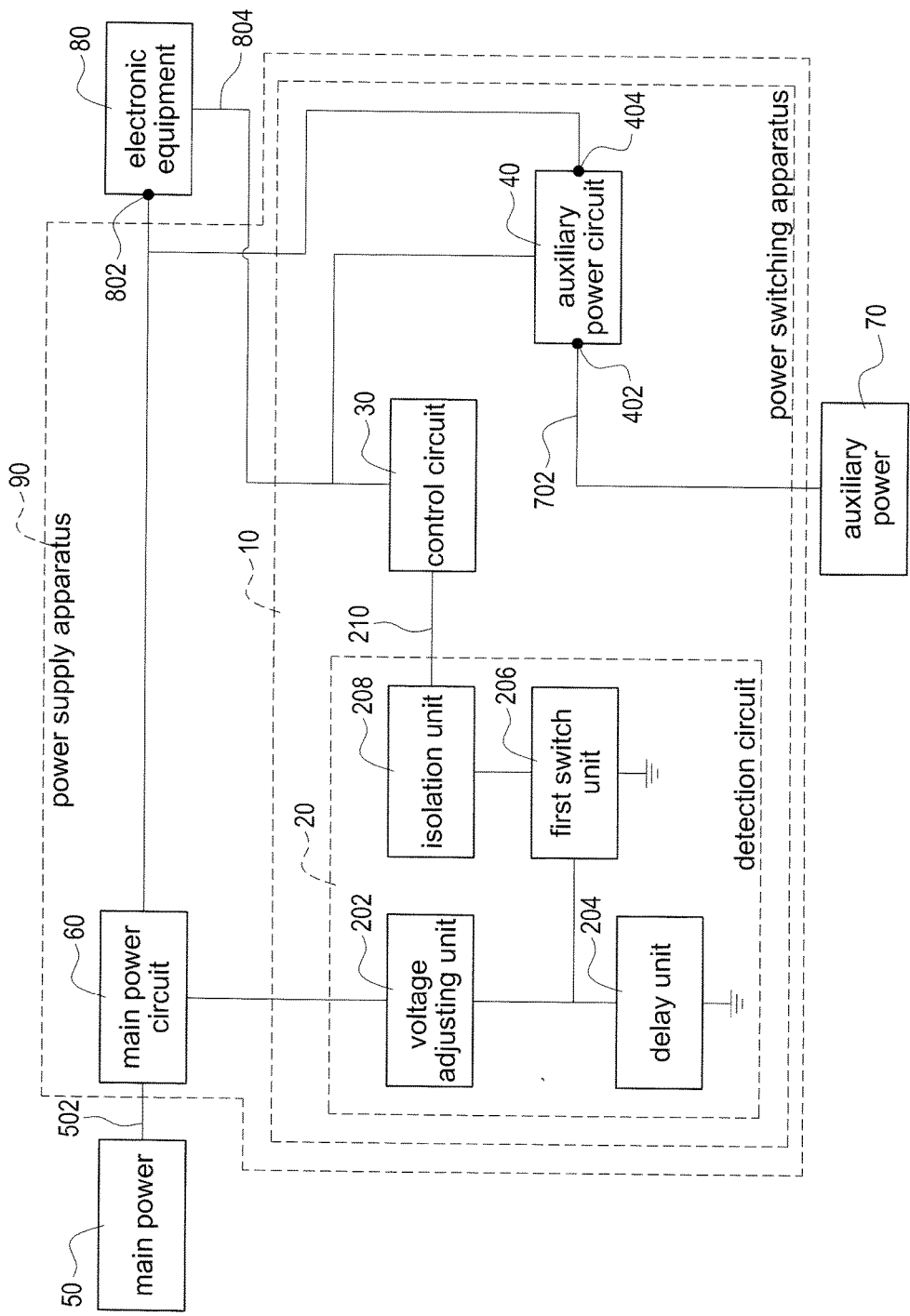
FIG. 1 shows a block diagram of the power switching apparatus of the present invention.

FIG. 1 shows a block diagram of the power switching apparatus of the present invention. A power supply apparatus 90 comprises a power switching apparatus 10 and a main power circuit 60. The power switching apparatus 10 comprises a detection circuit 20, a control circuit 30 and an auxiliary power circuit 40. The detection circuit 20 comprises a voltage adjusting unit 202, a delay unit 204, a first switch unit 206 and an isolation unit 208 (for example, a photo-coupler). The auxiliary power circuit 40 comprises an auxiliary power input side 402 and an output side 404.

The first switch unit 206 is electrically connected to the voltage adjusting unit 202 and the delay unit 204. The voltage adjusting unit 202 adjusts a starting voltage of the first switch unit 206. When a main power 50 (for example, an alternating current power) supplies power normally or the main power 50 stops supplying power but the delay unit 204 continues working in a setting time, the first switch unit 206 is turned on. The setting time is determined by a system requirement. When the main power 50 stops supplying power and the delay unit 204 stops working, the first switch unit 206 is turned off.

The isolation unit 208 is electrically connected to the first switch unit 206. When the first switch unit 206 is turned on, the isolation unit 208 sends out a first signal 210. When the first switch unit 206 is turned off, the isolation unit 208 does not send out the first signal 210. The control circuit 30 receives the first signal 210. The auxiliary power circuit 40 is electrically connected to the control circuit 30.

When the control circuit 30 receives the first signal 210, the control circuit 30 renders that the auxiliary power input side 402 does not conduct to the output side 404. When the control circuit 30 does not receive the first signal 210, the control circuit 30 renders that the auxiliary power input side 402 conducts to the output side 404.

Moreover, the detection circuit 20 detects whether the main power circuit 60 receives an alternating current voltage 502 sent by the main power 50 or not. The auxiliary power 70 (for example, a battery) is connected to the auxiliary power input side 402. An equipment voltage input side 802 of an electronic equipment 80 is connected to the main power circuit 60 and the output side 404. When the main power circuit 60 receives the alternating current voltage 502 sent by the main power 50, the main power circuit 60 supplies power to the electronic equipment 80 through the equipment voltage input side 802. The electronic equipment 80 sends a power requirement signal 804 (for example, a high signal) to the power switching apparatus 10. The delay unit 204 delays a starting time of the first switch unit 206 to adjust a switching time switching from the main power 50 to the auxiliary power 70.

When the main power circuit 60 receives the alternating current voltage 502 sent by the main power 50, the detection circuit 20 detects that the main power circuit 60 receives the alternating current voltage 502 sent by the main power 50, so that the detection circuit 20 turns on the first switch unit 206. When the main power circuit 60 does not receive the alternating current voltage 502 sent by the main power 50 but the delay unit 204 continues working in the setting time, the first switch unit 206 is turned on. When the main power circuit 60 does not receive the alternating current voltage 502 sent by the main power 50 and the delay unit 204 stops working, the first switch unit 206 is turned off.

When the first switch unit 206 is turned on, the isolation unit 208 sends the first signal 210 to the control circuit 30, so that the control circuit 30 renders that the auxiliary power input side 402 does not conduct to the output side 404, so that the auxiliary power 70 does not send an auxiliary voltage 702 to the electronic equipment 80 through the auxiliary power input side 402 and the output side 404. At this time, the main power circuit 60 supplies power to the electronic equipment 80 through the equipment voltage input side 802.

When the first switch unit 206 is turned off, the isolation unit 208 does not send the first signal 210 to the control circuit 30, so that the control circuit 30 renders that the auxiliary power input side 402 conducts to the output side 404, so that the auxiliary power 70 sends the auxiliary voltage 702 to the electronic equipment 80 through the auxiliary power input side 402 and the output side 404. At this time, the auxiliary power 70 supplies power to the electronic equipment 80 through the equipment voltage input side 802.

Figure 2:
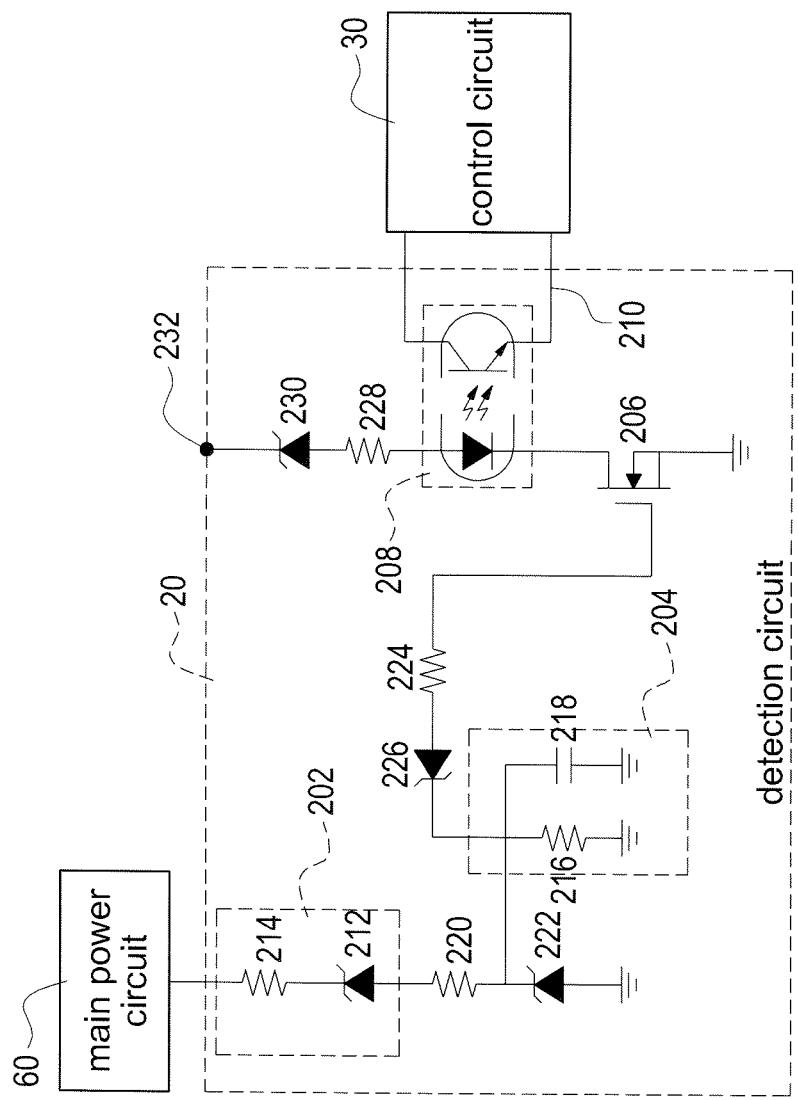
FIG. 2 shows a circuit diagram of an embodiment of the detection circuit of the present invention.

FIG. 2 shows a circuit diagram of an embodiment of the detection circuit of the present invention. The description for the elements shown in FIG. 2, which are similar to those shown in FIG. 1, is not repeated here for brevity. The voltage adjusting unit 202 comprises a voltage adjusting Zener diode 212 and a voltage adjusting resistor 214. The voltage adjusting Zener diode 212 is electrically connected to the delay unit 204 and the first switch unit 206. The voltage adjusting resistor 214 is electrically connected to the voltage adjusting Zener diode 212. The delay unit 204 comprises a delay resistor 216 and a delay capacitor 218. The delay resistor 216 is electrically connected to the first switch unit 206 and the voltage adjusting unit 202. The delay capacitor 218 is electrically connected to the first switch unit 206, the voltage adjusting unit 202 and the delay resistor 216.

Moreover, the detection circuit 20 further comprises a first resistor 220, a first Zener diode 222, a second resistor 224, a second Zener diode 226, a third resistor 228, a third Zener diode 230 and a detection-side voltage supply point 232.

The first resistor 220 is electrically connected to the voltage adjusting unit 202 and the delay unit 204. The first Zener diode 222 is electrically connected to the first resistor 220 and the delay unit 204. The second resistor 224 is electrically connected to the first switch unit 206. The second Zener diode 226 is electrically connected to the second resistor 224, the first resistor 220, the first Zener diode 222 and the delay unit 204. The third resistor 228 is electrically connected to the isolation unit 208. The third Zener diode 230 is electrically connected to the third resistor 228. The detection-side voltage supply point 232 is electrically connected to the third Zener diode 230.

Figure 3:
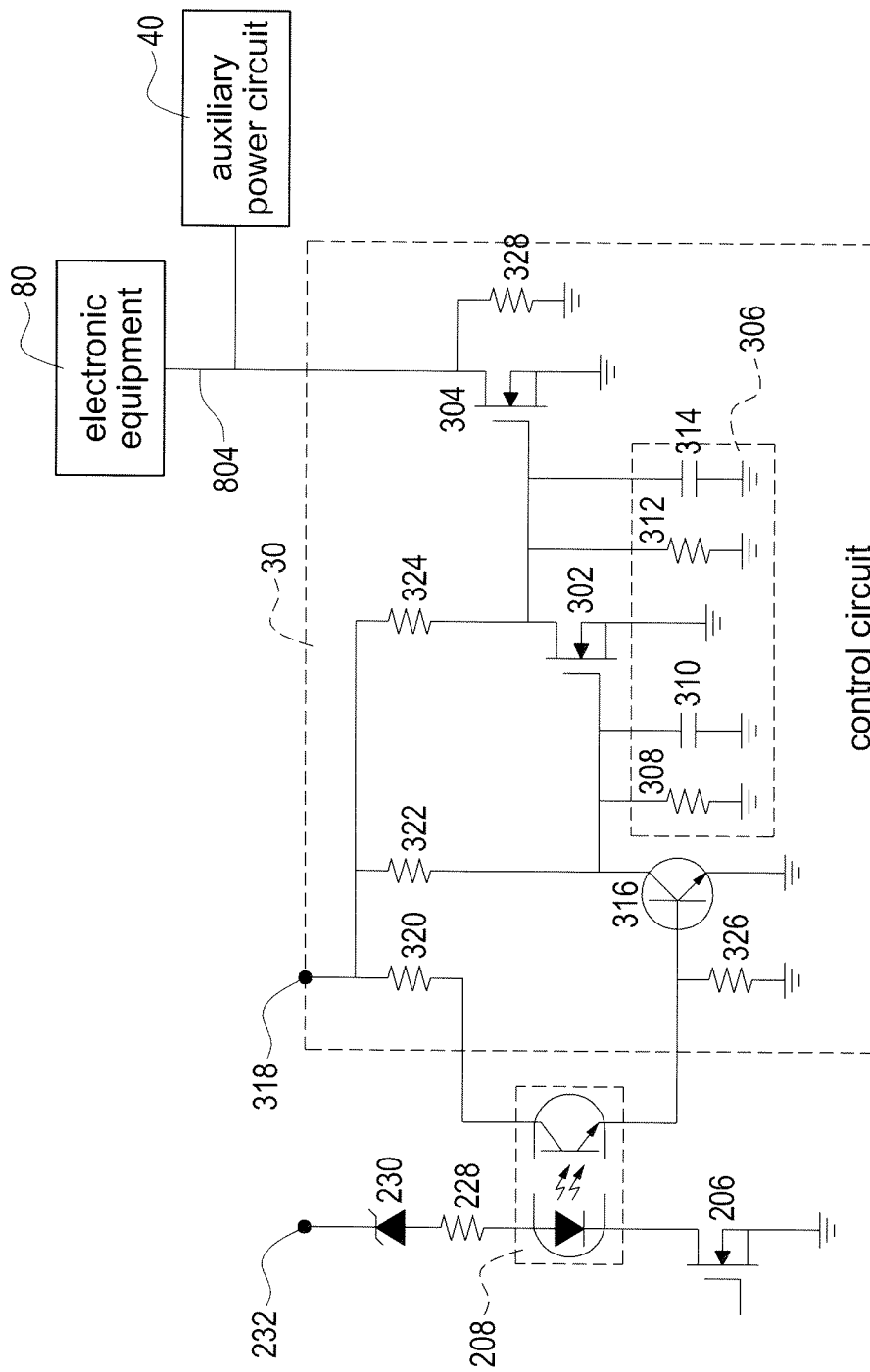
FIG. 3 shows a circuit diagram of an embodiment of the control circuit of the present invention.

FIG. 3 shows a circuit diagram of an embodiment of the control circuit of the present invention. The description for the elements shown in FIG. 3, which are similar to those shown in FIG. 1 and FIG. 2, is not repeated here for brevity. The control circuit 30 comprises a second switch unit 302, a third switch unit 304 and a delay sub-circuit 306. The third switch unit 304 is electrically connected to the second switch unit 302. The delay sub-circuit 306 is electrically connected to the second switch unit 302 and the third switch unit 304.

The delay sub-circuit 306 comprises a delay-side first resistor 308, a delay-side first capacitor 310, a delay-side second resistor 312 and a delay-side second capacitor 314. The delay-side first resistor 308 is electrically connected to the second switch unit 302. The delay-side first capacitor 310 is electrically connected to the second switch unit 302 and the delay-side first resistor 308. The delay-side second resistor 312 is electrically connected to the second switch unit 302 and the third switch unit 304. The delay-side second capacitor 314 is electrically connected to the second switch unit 302, the third switch unit 304 and the delay-side second resistor 312.

Moreover, the control circuit 30 further comprises a fourth switch unit 316, a control-side voltage supply point 318, a first control-side resistor 320, a second control-side resistor 322, a third control-side resistor 324, a fourth control-side resistor 326 and a fifth control-side resistor 328.

The fourth switch unit 316 is electrically connected to the isolation unit 208, the delay-side first resistor 308, the delay-side first capacitor 310 and the second switch unit 302. The first control-side resistor 320 is electrically connected to the isolation unit 208 and the control-side voltage supply point 318. The second control-side resistor 322 is electrically connected to the control-side voltage supply point 318, the first control-side resistor 320, the fourth switch unit 316, the delay-side first resistor 308, the delay-side first capacitor 310 and the second switch unit 302. The third control-side resistor 324 is electrically connected to the control-side voltage supply point 318, the first control-side resistor 320, the second control-side resistor 322, the second switch unit 302, the delay-side second resistor 312, the delay-side second capacitor 314 and the third switch unit 304. The fourth control-side resistor 326 is electrically connected to the isolation unit 208 and the fourth switch unit 316. The fifth control-side resistor 328 is electrically connected to the third switch unit 304.

Please refer to FIG. 1 as well. When the control circuit 30 receives the first signal 210, the second switch unit 302 is turned off, so that the third switch unit 304 is turned on by a voltage supplied by the control-side voltage supply point 318, so that the power requirement signal 804 is coupled to ground through the third switch unit 304 (namely, the power requirement signal 804 is pulled low), so that the auxiliary power input side 402 does not conduct to the output side 404. When the control circuit 30 does not receive the first signal 210, the second switch unit 302 is turned on by the voltage supplied by the control-side voltage supply point 318, so that the third switch unit 304 is turned off, so that the power requirement signal 804 is not coupled to ground through the third switch unit 304, so that the auxiliary power input side 402 conducts to the output side 404.

More specifically, when the fourth switch unit 316 receives the first signal 210, the fourth switch unit 316 is turned on, so that the second switch unit 302 is turned off, so that the third switch unit 304 is turned on by the voltage supplied by the control-side voltage supply point 318, so that the power requirement signal 804 is coupled to ground through the third switch unit 304, so that the auxiliary power input side 402 does not conduct to the output side 404 (because the auxiliary power circuit 40 cannot receive the power requirement signal 804). When the fourth switch unit 316 does not receive the first signal 210, the fourth switch unit 316 is turned off, so that the second switch unit 302 is turned on by the voltage supplied by the control-side voltage supply point 318, so that the third switch unit 304 is turned off, so that the power requirement signal 804 is not coupled to ground through the third switch unit 304, so that the auxiliary power input side 402 conducts to the output side 404 (because the auxiliary power circuit 40 receives the power requirement signal 804). This content will be described in details with FIG. 4 later.

Moreover, the delay sub-circuit 306 delays starting times of the second switch unit 302 and the third switch unit 304 to adjust the switching time switching from the main power 50 to the auxiliary power 70. Moreover, the delay-side first resistor 308 and the delay-side first capacitor 310 delay the starting time of the second switch unit 302. The delay-side second resistor 312 and the delay-side second capacitor 314 delay the starting time of the third switch unit 304.

Figure 4:
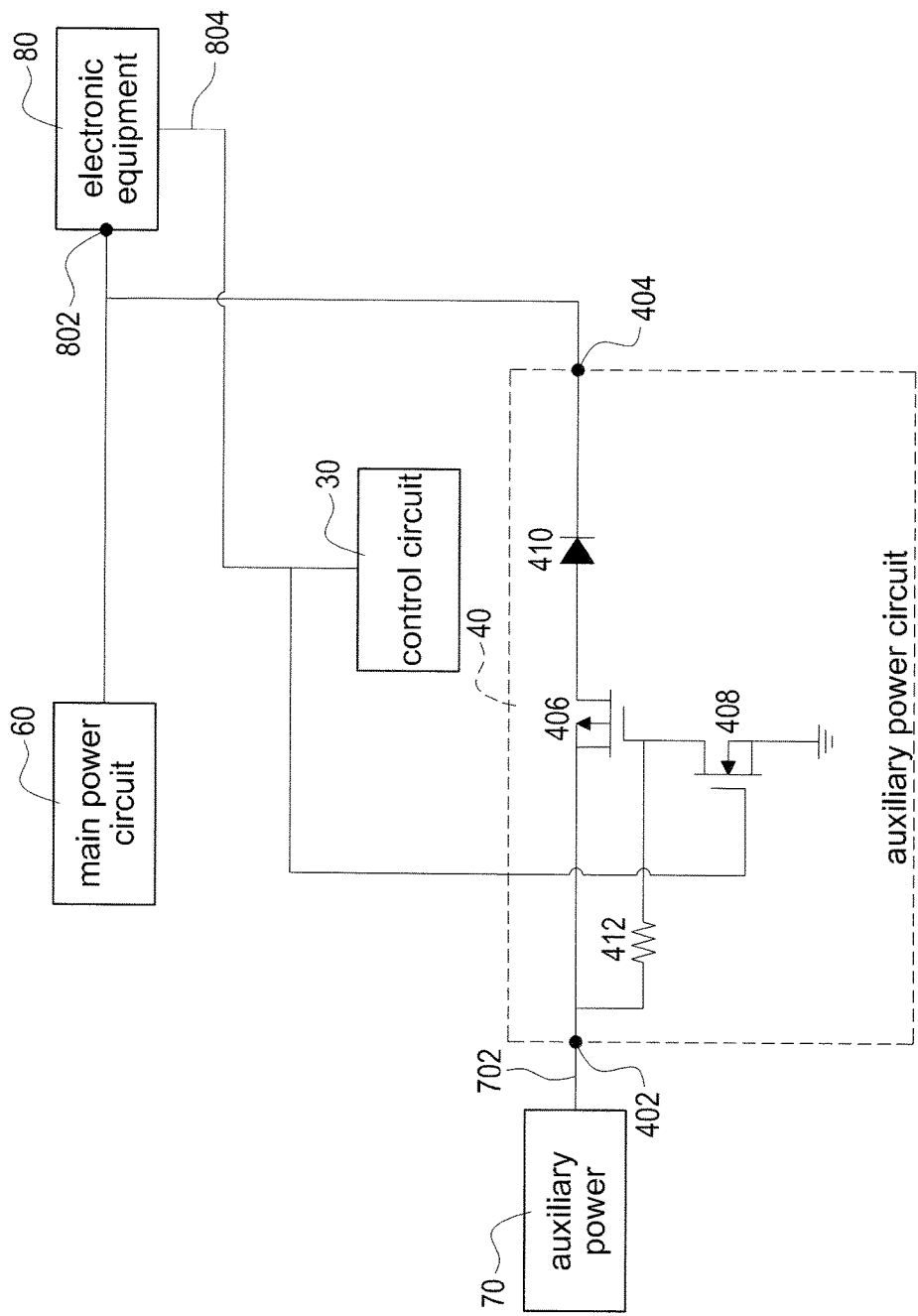
FIG. 4 shows a circuit diagram of an embodiment of the auxiliary power circuit of the present invention.

FIG. 4 shows a circuit diagram of an embodiment of the auxiliary power circuit of the present invention. The description for the elements shown in FIG. 4, which are similar to those shown in FIG. 1, FIG. 2 and FIG. 3, is not repeated here for brevity. The auxiliary power circuit 40 further comprises a first auxiliary-side switch unit 406, a second auxiliary-side switch unit 408, an auxiliary-side diode 410 and an auxiliary-side resistor 412. The first auxiliary-side switch unit 406 is electrically connected to the auxiliary power input side 402. The second auxiliary-side switch unit 408 is electrically connected to the first auxiliary-side switch unit 406 and the control circuit 30. The auxiliary-side diode 410 is electrically connected to the output side 404 and the first auxiliary-side switch unit 406. The auxiliary-side resistor 412 is electrically connected to the auxiliary power input side 402, the first auxiliary-side switch unit 406 and the second auxiliary-side switch unit 408.

Moreover, continuing from FIG. 3 mentioned above, when the power requirement signal 804 is coupled to ground through the third switch unit 304, the second auxiliary-side switch unit 408 cannot receive the power requirement signal 804, so that the second auxiliary-side switch unit 408 is turned off, so that the first auxiliary-side switch unit 406 is turned off, so that the auxiliary power input side 402 does not conduct to the output side 404, so that the auxiliary power 70 does not send the auxiliary voltage 702 to the electronic equipment 80 through the auxiliary power input side 402 and the output side 404. When the power requirement signal 804 is not coupled to ground through the third switch unit 304, the second auxiliary-side switch unit 408 receives the power requirement signal 804, so that the second auxiliary-side switch unit 408 is turned on, so that the first auxiliary-side switch unit 406 is turned on, so that the auxiliary power input side 402 conducts to the output side 404, so that the auxiliary power 70 sends the auxiliary voltage 702 to the electronic equipment 80 through the auxiliary power input side 402 and the output side 404. The auxiliary-side diode 410 prevents power generated by the main power circuit 60 from being sent to the auxiliary power circuit 40 to protect the auxiliary power circuit 40 and the auxiliary power 70.

The advantage of the present invention is to provide a power switching apparatus 10 with simple circuit structures. The switching time switching from the main power 50 to the auxiliary power 70 is adjustable to ensure that the switching time is enough. The main power 50, the auxiliary power 70, the main power circuit 60 and the electronic equipment 80 are protected perfectly when switching power.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. A power switching apparatus comprising:
   a detection circuit comprising:
   a voltage adjusting unit;
   a delay unit;
   a first switch unit electrically connected to the voltage adjusting unit and the delay unit, the voltage adjusting unit adjusting a starting voltage of the first switch unit, when a main power supplies power normally or the main power stops supplying power but the delay unit continues working in a setting time, the first switch unit being turned on, when the main power stops supplying power and the delay unit stops working, the first switch unit being turned off; and
   an isolation unit electrically connected to the first switch unit, when the first switch unit is turned on, the isolation unit sending out a first signal, when the first switch unit is turned off, the isolation unit does not send out the first signal;
   a control circuit receiving the first signal; and
   an auxiliary power circuit comprising an auxiliary power input side and an output side, the auxiliary power circuit electrically connected to the control circuit, wherein the auxiliary power circuit further comprises:
      a first auxiliary-side switch unit electrically connected to the auxiliary power input side;
      a second auxiliary-side switch unit electrically connected to the first auxiliary-side switch unit and the control circuit; and
      an auxiliary-side diode electrically connected to the output side and the first auxiliary-side switch unit;
   wherein when the control circuit receives the first signal, the control circuit renders that the second auxiliary-side switch unit is turned off, so that the first auxiliary-side switch unit is turned off, and that the auxiliary power input side does not conduct to the output side; when the control circuit does not receive the first signal, the control circuit renders that the second auxiliary-side switch unit is turned on, so that the first auxiliary-side switch unit is turned on, and the auxiliary power input side conducts to the output side.

2. The power switching apparatus in claim 1, wherein the voltage adjusting unit comprises:
   a voltage adjusting zener diode electrically connected to the delay unit and the first switch unit; and
   a voltage adjusting resistor electrically connected to the voltage adjusting zener diode.

3. The power switching apparatus in claim 1, wherein the delay unit comprises:
   a delay resistor electrically connected to the first switch unit and the voltage adjusting unit; and
   a delay capacitor electrically connected to the first switch unit, the voltage adjusting unit and the delay resistor.

4. The power switching apparatus in claim 1, wherein the control circuit comprises:
   a second switch unit; and
   a third switch unit electrically connected to the second switch unit, wherein when the control circuit receives the first signal, the second switch unit is turned off, so that the third switch unit is turned on, so that the auxiliary power input side does not conduct to the output side; when the control circuit does not receive the first signal, the second switch unit is turned on, so that the third switch unit is turned off, so that the auxiliary power input side conducts to the output side.

5. The power switching apparatus in claim 4, wherein the control circuit further comprises:
   a delay sub-circuit electrically connected to the second switch unit and the third switch unit.

6. The power switching apparatus in claim 5, wherein the delay sub-circuit comprises:
   a delay-side first resistor electrically connected to the second switch unit;
   a delay-side first capacitor electrically connected to the second switch unit and the delay-side first resistor;
   a delay-side second resistor electrically connected to the second switch unit and the third switch unit; and
   a delay-side second capacitor electrically connected to the second switch unit, the third switch unit and the delay-side second resistor.

* * * * *